(12) United States Patent
Neyens et al.

(10) Patent No.: US 9,726,545 B2
(45) Date of Patent: Aug. 8, 2017

(54) METHOD AND APPARATUS FOR MEASURING THE TEMPERATURE OF A MOLTEN METAL

(71) Applicant: Heraeus Electro-Nite International N.V., Houthalen (BE)

(72) Inventors: Guido Jacobus Neyens, Opoeteren (BE); Michel Thys, Koersel (BE); Frank Stevens, Hasselt (BE)

(73) Assignee: Heraeus Electro-Nite International N.V., Houthalen (BE)

(*) Notice: Subject to any disclaimer, the term of this patent is extended or adjusted under 35 U.S.C. 154(b) by 339 days.

(21) Appl. No.: 14/264,510

(22) Filed: Apr. 29, 2014

(65) Prior Publication Data

US 2014/0321504 A1 Oct. 30, 2014

(30) Foreign Application Priority Data

Apr. 30, 2013 (EP) .................................... 13165941

(51) Int. Cl.
*G01J 5/04* (2006.01)
*G01J 5/08* (2006.01)
(Continued)

(52) U.S. Cl.
CPC .............. *G01J 5/004* (2013.01); *B22D 2/006* (2013.01); *G01J 5/042* (2013.01); *G01J 5/048* (2013.01); *G01J 5/0821* (2013.01)

(58) Field of Classification Search
CPC ..................................................... G01J 5/004
(Continued)

(56) References Cited

U.S. PATENT DOCUMENTS

| 2,886,617 A | 5/1959 | Sorg et al. |
| 2,993,944 A | 7/1961 | Silver |

(Continued)

FOREIGN PATENT DOCUMENTS

| CN | 1699938 A | 11/2005 |
| CN | 100427909 C | 10/2008 |

(Continued)

OTHER PUBLICATIONS

Office Action issued Mar. 29, 2016 in JP Application No. 2014-088614.

(Continued)

*Primary Examiner* — Minh Phan
*Assistant Examiner* — Leon W. Rhodes, Jr.
(74) *Attorney, Agent, or Firm* — Panitch Schwarze Belisario & Nadel LLP

(57) ABSTRACT

A method, device and apparatus are provided for measuring the temperature of a melt, particularly of a molten metal, with an optical fiber, fed into the melt through a disposable guiding tube. The optical fiber and an immersion end of the tube are immersed into the melt and have feeding speeds which are independent from each other. An elastic plug is arranged within the tube or at an end of the tube opposite the immersion end. The optical fiber is fed through the elastic plug, and the elastic plug reduces a gap between the optical fiber and the tube, which has a larger inner diameter than the outer diameter of the optical fiber. The apparatus includes a fiber coil and a feeding mechanism for feeding the optical fiber and the tube, including at least two independent feeding motors, one for feeding the optical fiber and one for feeding the tube.

17 Claims, 5 Drawing Sheets

(51) Int. Cl.
*B22D 2/00* (2006.01)
*G01J 5/00* (2006.01)

(58) Field of Classification Search
USPC .......................................................... 374/140
See application file for complete search history.

(56) References Cited

U.S. PATENT DOCUMENTS

| | | | | |
|---|---|---|---|---|
| 3,327,531 A * | 6/1967 | Fradeneck | ............... | B22D 2/00 |
| | | | | 136/230 |
| 3,763,704 A * | 10/1973 | Blau | ........................ | G01K 7/08 |
| | | | | 136/234 |
| 4,468,771 A | 8/1984 | Zhukov et al. | | |
| 5,064,295 A | 11/1991 | Thill et al. | | |
| 5,163,321 A | 11/1992 | Perales | | |
| 5,585,914 A | 12/1996 | Yamasaki et al. | | |
| 5,733,043 A * | 3/1998 | Yamada | .................. | G01J 5/041 |
| | | | | 266/99 |
| 6,172,367 B1 | 1/2001 | Fritz et al. | | |
| 6,749,661 B2 | 6/2004 | Shver | | |
| 6,923,573 B2 | 8/2005 | Yamashita et al. | | |
| 6,964,516 B2 * | 11/2005 | Coleman, Jr. | ......... | G01J 5/0044 |
| | | | | 266/99 |
| 7,384,192 B2 * | 6/2008 | Dams | .................... | G01J 5/0044 |
| | | | | 374/139 |
| 7,767,137 B2 | 8/2010 | Wunsche | | |
| 7,891,867 B2 | 2/2011 | Dams et al. | | |
| 2005/0175065 A1 | 8/2005 | Coleman | | |
| 2011/0038391 A1 | 2/2011 | Miani et al. | | |

FOREIGN PATENT DOCUMENTS

| | | | | |
|---|---|---|---|---|
| EP | 0 655 613 A1 | | 5/1995 | |
| EP | 0 747 492 A1 | | 12/1996 | |
| EP | 0 802 401 A1 | | 10/1997 | |
| EP | 0 806 640 A2 | | 11/1997 | |
| EP | 1 857 760 A1 | | 11/2007 | |
| JP | 61091529 A | * | 5/1986 | |
| JP | S61-091529 A | | 5/1986 | |
| JP | S62-019727 A | | 1/1987 | |
| JP | S62-052423 A | | 3/1987 | |
| JP | 06058816 A | * | 3/1994 | |
| JP | H06-058816 A | | 3/1994 | |
| JP | H07151607 A | | 6/1995 | |
| JP | H07-229791 A | | 8/1995 | |
| JP | 08015040 A | * | 1/1996 | |
| JP | H08-015040 A | | 1/1996 | |
| JP | H08-82553 A | | 3/1996 | |
| JP | H0875553 A | | 3/1996 | |
| JP | 09101206 A | * | 4/1997 | |
| JP | 09105675 A | * | 4/1997 | |
| JP | H09-101206 A | | 4/1997 | |
| JP | H09-304185 A | | 11/1997 | |
| JP | 2000-186961 A | | 7/2000 | |
| JP | 2010-071666 A | | 4/2010 | |
| JP | 2010071666 A | * | 4/2010 | |
| JP | 2011169917 A | | 9/2011 | |
| WO | 98/46971 A1 | | 10/1998 | |
| WO | 02/48661 A1 | | 6/2002 | |

OTHER PUBLICATIONS

Office Action issued Mar. 31, 2016 in KR Application No. 10-2014-0052968.
EP Search Report issued on Sep. 30, 2013 in EP Application No. 13165941.9.
P. Clymans, "Applications of an immersion-type optical fiber pyrometer," La Revue de Métallurgie-CIT, pp. 769-774, Jun. 2000.
Metzen et al., "Oxygen technology for highly efficient electric arc steelmaking," MPT International, pp. 84-92 (Apr. 2000).
Office Action issued Apr. 21, 2015 in JP Application No. 2014-088614.
Office Action issued May 21, 2015 in KR Application No. 10-2014-0052968.
Office Action issued Jul. 7, 2014 in AU Application No. 2014202069.
Office Action issued on Jun. 2, 2016 in CN Application No. 201410125884.3.
Office Action issued on Feb. 6, 2017 in CN Application No. 201410125884.3.

* cited by examiner

METHOD AND APPARATUS FOR MEASURING THE TEMPERATURE OF A MOLTEN METAL

BACKGROUND OF THE INVENTION

The invention relates to a method, a device and an apparatus for measuring the temperature of a melt, particularly of a molten metal, for example molten steel, with an optical fiber.

The Electric Arc Furnace (EAF) process for the production of molten steel is a batch process made up of the following operations: furnace charging of metallic components, melting, refining, de-slagging, tapping, and furnace turnaround. Each batch of steel, called a heat, is removed from the melting furnace in a process called tapping, and hence, a reference to the cyclic batch rate of steel production is commonly a unit of time termed the tap-to-tap time. A modern EAF operation aims for a tap-to-tap cycle of less than 60 minutes and is more on the order of 35-40 minutes.

Many of the advances made in EAF productivity, which make rapid tap-to-tap times possible, are related to increased electrical power input (in the range of 350-400 kWh/t), and alternative forms of energy input (oxygen lancing, oxy-fuel burners) into the furnace. Most advanced EAF operations consume on the order of 18-27 $Nm^3/t$ of supplemental oxygen, which supplies 20-32% of the total power input. In addition, improvements to components which allow for faster furnace movement have reduced the amount of time in which the furnace stands idle. The industrial objective of EAF operators has been to maximize the furnace power-on time, resulting in maximum productivity in order to reduce fixed costs, while at the same time gaining the maximum benefit from the electrical power input. The majority of time consumed in the production of one heat of steel in the EAF is in the process step of melting.

The melting period is the heart of EAF operations and in the majority of modern EAFs occurs in a two stage process. Electrical energy is supplied via graphite electrodes and is the largest contributor in the melting operation. To melt steel scrap, it takes a theoretical minimum of 300 kWh/t. To provide the molten metal with a temperature above that of the melting point of steel requires additional energy. For typical tap temperature requirements, the total theoretical energy required usually lies in the range of 350-400 kWh/t. However, EAF steelmaking is only 55-65% energy efficient and as a result the total equivalent energy input is usually in the range of 650 kWh/t for most modern operations with 60-65% supplied by electric power, and the remaining requirements supplied by fossil fuel combustion and the chemical oxidation energy of the refining process.

During the first metallic charge, usually an intermediate voltage tap is selected until the electrodes can sufficiently bore into the scrap. The position of unmelted scrap between the electrode arc and the side wall of the melting vessel protects the furnace structure from damage, such that a long arc (high voltage) tap can be used after boring. Approximately 15% of the scrap is melted during the initial bore-in period. Fossil fuel combustion added through special nozzles in the furnace wall contributes to scrap heating and thermal uniformity. As the furnace atmosphere heats up, the arcing tends to stabilize, and the average power input can be increased. As the long arc maximizes the transfer of power to the scrap, the beginnings of a liquid pool of metal will form in the furnace hearth. For some specific EAF types, it is a preferable practice to start the batch melting process with a small pool held over from the previous heat called a "hot-heel".

When enough scrap has been melted to accommodate the volume of second charge, the charging process is repeated. Once a molten pool of steel is generated in the furnace, chemical energy is now supplied via several sources, such as oxy-fuel burners and oxygen lancing. Oxygen can be lanced directly into the bath once the molten metal height is sufficient and clear of obstructive scrap.

Nearing the time that the final scrap charge is fully melted, the furnace sidewalls can be exposed to high radiation from the arc. As a result, the voltage must be reduced for the creation of a foamy slag that envelops the electrodes. The slag layer may have a thickness of more than a meter while foaming. The arc in now buried and will protect the furnace shell. In addition, a greater amount of energy will be retained in the slag and is transferred to the bath resulting in greater energy efficiency. This process will create a lot of heat in the slag layer covering the steel, resulting in temperatures that are up to 200° C. higher than the steel temperature and creating a very unique and difficult environment for process control measurements for reasons explained later.

For reducing the tap-to-tap time for a heat, in many instances and especially in modern EAF operations operating with a hot heel, oxygen may be blown into the bath throughout the heat cycle. This oxygen will react with several components in the bath, including aluminum, silicon, manganese, phosphorus, carbon, and iron. All of these reactions are exothermic (i.e., they generate heat) and will supply energy to aid in the melting of the scrap. The metallic oxides which are formed will eventually reside in the slag.

When the final scrap charge and raw materials are substantially melted, flat bath conditions are reached. At this point, a bath temperature and a chemical analysis sample will be taken to determine an approximate oxygen refining period and a calculation of the remaining power-on time until tap.

Regardless of the specific local processing steps, which may vary depending upon the utilization of available raw material, furnace design, local operating practices, and the local economies of production, it is evident that many forms of energy inputs to the furnace may be employed in a variety of strategies, in order to minimize the tap-to-tap time and improve energy efficiency during the conversion of solid scrap and slag components to molten steel and slag at the correct chemical composition and desired temperature for tapping.

As in other steelmaking processes, the tap-to-tap production process of an EAF is guided by mathematical models that take into account the quantity and quality of raw materials, in order to predict the process end point given the energy inputs and heat outputs. A listing of such variables can be found in European patent application Publication EP 0 747 492 A1. Many of the process models used to control and predict EAF performance are well known in the art. When compared to the classic steelmaking process of blast furnace to converter, the variance of the raw materials used in the EAF process is much higher and as such requires constant adjustments. One of several information inputs to these models, required to correct and guide the process, is the molten metal temperature.

Providing the EAF operator with the best and most recent molten metal temperature information should satisfy the following requirements:

an accurate temperature representative of the bulk metal,
fixed immersion depth independent of the furnace tilt, continuously or nearly continuously available, and
bath level determination for immersion depth adjustments.

Typically, a temperature measurement of the molten metal is accomplished using well known disposable thermocouples, such as described in U.S. Pat. No. 2,993,944. These thermocouples can be immersed manually by an operator with a steel pole having adapted electrical wiring and connections to convey the thermocouple signal to appropriate instrumentation. Additionally, many automatic thermocouple immersion mechanical systems are now utilized to provide thermocouple immersions, such as those publically available from www.more-oxy.com or described in the literature Metzen et al., *MPT International*, pp. 84 (April 2000).

Once pooling of molten metal is established, the bath temperature will slowly increase. The higher the content of the non-molten scrap, the lower the rate of temperature increase will be for a given energy input. Once all the scrap is molten, the temperature of the bath will increase very rapidly, on the order of 35° C.-70° C./minute towards the end of the process. In order to predict the optimum process end, the time that the metal is ready to tap, the process control models need to have temperature information that is accurate and at a sufficiently high frequency of measurements to create an accurate forecast of the best moment to stop the various energy inputs. The measuring process using robotic immersion devices requires that an access hatch, typically the slag door, a general description of which appears in U.S. patent application Publication No. 2011/0038391 and in U.S. Pat. No. 7,767,137, be opened to allow insertion of a mechanical arm supporting a disposable thermocouple. In most modern operations, this door is also used to provide access to the furnace for oxy-fuel burners and oxygen lances, which are brought into position with a similar manipulator to that of the immersion lance. More recently, several additional ports may also be provided around the circumference of the furnace shell for burners, as described in U.S. Pat. No. 6,749,661.

Opening of the slag door for the purpose of obtaining temperature late in the process allows a large amount of air to enter the furnace. Consequences of this opening are cooling the local area and providing a source for nitrogen. During arcing, nitrogen is converted to $NO_x$ which is an undesirable effluent of the EAF process. While it is necessary to de-slag the furnace through this opening, the use of robotic immersion equipment also utilizing this opening to take temperatures, exposes the furnace interior to unnecessary nitrogen ingress and unintentional de-slagging during periods when repeated temperature measurements are required.

With a rapid temperature rise during the end stages of the metal refining process, the update time for a process control model under the best of circumstances cannot keep up with modern high-powered furnaces. Ideally, rapid temperature updates during the end of refining and continuous temperature information during the last minutes prior to tap provide the best combination for model prediction accuracy and end point determination. A realistic test-to-test time of 1 minute for typical robotic systems limits the usefulness of spot measurements of such a dynamic process. Conventional disposable thermocouples and robotic immersion equipment suffer from several additional limitations, besides a low sampling frequency that ultimately reduces the predictive success of the process models, when used for accurate end point decisions.

During the melting and refining processes, the bath will have a temperature gradient, whereas the surface of the bath will have a significantly higher temperature than that of the bulk molten metal. Hot and cold spots of metal are located throughout the furnace interior, necessitating the use of specialized burners and directional fossil fueled heaters to help homogenize the interior. As indicated in European patent application Publication EP 1 857 760 A1, one cold spot is in the area of the slag door where the immersion of disposable thermocouples typically occurs due to the large access requirements of the typical robotic immersion equipment. An EAF has to have the ability to 'rock' furnace, that is, to tilt the horizontal position of the furnace, front to back, in order to further homogenize the bath, de-slag and tap the furnace, as described in U.S. Pat. No. 2,886,617.

Most all robotic immersion devices are mounted in the area of the slag door and are mounted on the operating floor, and thus do not tilt through the angle of the tilted furnace. Because of this, these manipulators cannot position disposable thermocouples into the bath at all times and under all circumstances. Furthermore, the immersion depth of the thermocouple is linked to the articulation of the mechanical arm of the robotic device and as such cannot readily adjust to a bath level change, due to the angle of the furnace tilt. While it is important to repeatedly measure in a location that reflects the bulk temperature for the purpose of the operating models of the EAF process, the actual temperature measurements taken with either a manual or automatic lance show difficulties towards stable immersion depths, not available while the position of the immersion lance is not aligned to the rocking of the furnace and the actual bath level, and not in a location conducive to temperature accuracy.

There are numerous temperature measuring devices in the prior art installed in a variety of steelmaking vessels that utilize permanent optical light guides to focus the radiation towards the optical detectors. Examples of such prior art can be found in Japanese patent application publications JP 61-91529 A and JP 62-52423 A, U.S. Pat. Nos. 4,468,771; 5,064,295; 6,172,367; and 6,923,573, and International patent application Publications WO 98/46971 and WO 02/48661. The commonality of this prior art is that the optical guides are permanent and, because of this, need to be protected from damage using complicated installations. These protective means may comprise gas purging to either cool the assembly or remove the metal from physical contact with the optical element, layers of protective sheathing that are relatively permanent or slightly erodible with the lining of the steelmaking vessel, and complicated emissivity correction of the light wavelength(s) and intensity in order to determine an accurate temperature.

Japanese patent application publication JP 08-15040 A describes a method that feeds a consumable optical fiber into liquid metal. The consumable optical fiber, such as disclosed in Japanese patent application publication JP 62-19727 A, when immersed into a molten metal at a predictable depth receives the radiation light emitted from the molten metal at blackbody conditions, such that the intensity of the radiation using a photo-electric conversion element mounted on the opposite end of the immersed consumable optical fiber can be used to determine the temperature of the molten metal. The scientific principle of the prior art concisely detailed in P. Clymans, "Applications of an immersion-type optical fiber pyrometer," is that the optical fiber must be immersed at a depth to achieve blackbody conditions.

Continuous measurements of molten metals using consumable optical fiber and equipment necessary to feed long lengths of coiled material to a predetermined depth are well known in the art, such as European patent application publication EP 0 806 640 A1 and Japanese Patent JP 3,267,122 B. In harsh industrial environments where the consumable optical fiber is immersed into higher temperature metals or in the presence of metals with a slag covering, maintaining a predetermined depth during the period of time the measurement should take place has proven to be difficult due to the inherent weakness in the optical fiber as its temperature increases. It has become necessary to protect the already metal covered fiber with additional protection, such as gas cooling (Japanese patent application publication JP 2000-186961 A), additional composite materials layered over the metal covered fiber (European patent application publication EP 0 655 613 A), insulating covering (Japanese patent application publication JP 06-058816 A), or additional metal covers (U.S. Pat. No. 5,163,321 and Japanese Patent JP 3,351,120 B.

The above improvements for high temperature use have the disadvantage of dramatically increasing the cost of the consumable fiber assembly in order to provide a continuous temperature reading. Although not exactly identical to the conditions encountered when measuring higher temperatures in an EAF, Japanese Patent JP 3,351,120 B is useful to have an appreciation of the speed of consumption of the optical fiber. In the disclosed example, a very complex mechanical device for feeding an optical fiber from a coil is used. The coil consists of the metal covered optical fiber covered again with additional 3 mm thick stainless steel tubing. The disclosed calculations recommended for improved temperature accuracy for continuous temperature measurements in iron of a blast furnace tap stream is an astonishing 500 mm/sec. The optical fiber and its enclosing stainless steel outer tube are costly to consume at this recommended feeding rate.

A practical economy of continuous temperature measurements depends upon consuming the least amount of fiber possible, while still obtaining the benefit of continuous information. Bringing the optical fiber to the measuring point with the least amount of exposed fiber is described in U.S. Pat. No. 5,585,914 and Japanese patent application publication JP 2000-186961 A, where a single metal covered fiber is fed through a permanent nozzle that could be mounted in the furnace wall and through which gas is injected. While these devices can successfully deliver the fiber to the measuring point, they become a liability due to clogging and continuing maintenance. At stages in the feeding mode, vibration is required to prevent the fiber from welding to the nozzle. If the port is blocked or closes due to inadequate gas pressure, the measurement is terminated with no possibility of recovering until the nozzle is repaired. European patent application publication EP 0 802 401 A addresses the problem of a blocked opening to the furnace with a series of punch rods and guide tubes positioned on a movable carriage, providing a tool set for addressing whichever problem prevents the fiber from passing through the nozzle. However, these are strategies to unblock a closed access port from which no measuring data can be obtained. Once these ports are blocked there is no possibility to obtain temperature data, which could be at critical times in the steelmaking process.

An additional problem arises for continuously fed optical fibers, which further increase the cost of measurement and the complexity of the immersion equipment. The immersion type optical fiber only maintains its optical quality, and thus returns an accurate temperature, if it stays protected against heat and contamination or is renewed at a rate higher than its degradation rate. The optical signal of the bath temperature is accurately obtained in blackbody conditions for the part immersed in the molten steel. However, the remaining un-immersed portion above must remain a perfect light guide. At elevated temperatures, devitrification of the optical fiber will occur, the transmissivity of the light decreases, and an error in temperature as a function of decreased intensity increases. Japanese patent application publication JP 09-304185 A and U.S. Pat. No. 7,891,867 disclose a feeding rate method where the speed of fiber consumption must be greater than the rate of devitrification, thereby assuring that a fresh optical fiber surface is always available. Simple laboratory testing shows that the optical signal stays stable during a very short period, being around 1.0 sec at temperatures below 1580° C. and only 0.1 sec. while immersed at 1700° C. Although a solution for lower temperature metals, the speed of feeding optical fiber at a speed greater than the devitrification rate for elevated temperature testing is expensive for a simple metal covered optical fiber. In the case of measuring elevated temperatures in the harsh conditions of an EAF, the prior art-disclosed extra protection methods are also consumed at the same rate of speed as the optical fiber. This becomes prohibitively expensive for the above-mentioned double covered optical fibers.

BRIEF SUMMARY OF THE INVENTION

The invention of the present application works away from the prior teaching, preferring to provide a spot measurement rather than a continuous measurement. Invented is a low cost solution for temperature measurements suitable to be utilized at a sufficiently high sampling frequency to meet the updating demands of the mathematical models of the EAF melting process, while solving the problems associated with immersed optical fiber in harsh environments. The invention provides a near continuous temperature measuring output comprised of immersing an optical fiber into the molten metal through the slag covering without first contacting the slag, maintaining a predetermined immersion depth during the measuring period by controlled feeding, protecting the non-immersed portion against devitrification in the high ambient heat of the EAF interior, removing and recoiling unused fiber after the measurement, measuring the bath level upon recoiling, and immersion equipment for repeating the measuring processes always duplicating the initial starting conditions.

The invention measures temperature in a metallurgical vessel using a molten metal immersed consumable optical fiber and immersion equipment capable of inserting a temperature device through the side wall of an EAF to a predictable molten steel immersion depth with a temperature-to-temperature measuring frequency of less than 20 seconds. The ability to sample on-demand, singularly or in rapid succession allows a measuring strategy that can update a mathematical predictive model for EAF operations at key times during the process, with the ability to measure in rapid succession providing near continuous temperature data at a low cost.

The problem solved by the invention is to improve the known methods and devices. Providing the EAF operator with the best and most recent molten metal temperature information should satisfy the following requirements:
 an accurate temperature representative of the bulk metal,
 fixed immersion depth independent of the furnace tilt,
 continuously or nearly continuously available,
 bath level determination for immersion depth adjustments.

The method for measuring the temperature of a melt, particularly of a molten metal, with an optical fiber, is characterized in that the optical fiber is fed into the melt through a disposable guiding tube, wherein the optical fiber and an immersion end of the disposable guiding tube are immersed into the melt both having a feeding speeds which are independent from each other. Preferably, in a first phase of immersion the disposable guiding tube and the optical fiber are immersed into the melt, and in a second phase the optical fiber is immersed with higher speed and deeper into the melt than the disposable guiding tube. It is preferred that the second phase starts after the immersion end of the disposable guiding tube is immersed into the melt. Further, it is preferred that in a third phase of immersion the optical fiber is stopped or is withdrawn from the melt. It is advantageous if subsequent to the third phase the outer disposable guiding tube is ejected into the melt.

In a favorable embodiment of the invention the speed of the disposable guiding tube and/or of the optical fiber is varied during immersion. Further, it is favorable that the optical fiber and the disposable guiding tube are moved with unequal speed. It is advantageous that in addition to the temperature, also the upper surface of the melt is determined.

The inventive device for measuring the temperature of a melt, particularly of a molten metal, comprising an optical fiber and a disposable guiding tube, having an immersion end and a second end opposite to the immersion end, is characterized in that the optical fiber is partially arranged in the disposable guiding tube, wherein the inner diameter of the disposable guiding tube is larger than the outer diameter of the optical fiber, wherein an elastic plug is arranged at the second end of or within the disposable guiding tube, wherein the optical fiber is fed through the elastic plug, and wherein the elastic plug reduces a gap between the optical fiber and the disposable guiding tube. Preferably, the area of the gap is reduced to less than 2 $mm^2$, more preferably less than 1 $mm^2$.

The invention also relates to an apparatus for measuring temperature of a melt, particularly of a molten metal, with an optical fiber comprising a device as described before, comprising an optical fiber and a disposable guiding tube, having an immersion end and a second end opposite to the immersion end, wherein the optical fiber is partially arranged in the disposable guiding tube, wherein the inner diameter of the disposable guiding tube is larger than the outer diameter of the optical fiber, wherein an elastic plug is arranged at the second end of or within the disposable guiding tube, wherein the optical fiber is fed through the elastic plug, and wherein the elastic plug reduces a gap between the optical fiber and the disposable guiding tube, further comprising a fiber coil and a feeding mechanism for feeding the optical fiber and the disposable guiding tube, wherein the feeding mechanism comprises at least two independent feeding motors, one for feeding the optical fiber and one for feeding the disposable guiding tube. Preferably, the apparatus is characterized in that the feeding motors are each combined with a separate speed control.

Further, the invention is related to a method of use of an apparatus as described before in a method as defined by the foregoing description.

The invention is utilized to obtain temperature measurements needed to control the final processing steps of steelmaking in an EAF. To be useful for this purpose the device must:

Provide accurate temperature measurements at a sampling frequency that provides accurate updating of the process model and operator information towards tapping;

Provide intermediate measuring at the lowest cost; and

Have a metal measurement position representative of the metal temperature.

This is accomplished by a device which comprises:
a continuous temperature measuring element, the fiber, always connected to the instrumentation, which
  is always available,
  has no loss of availability waiting for connections,
  has rapid response time, with low contact time in metal and slag, and
  is low in cost;
an outer metal tube, which
  supports the fiber during rapid acceleration towards the bath, so as to avoid bending away from metal,
  guarantees that the fiber enters the metal, and avoids deflection upwards towards the slag,
  keeps the fiber from contacting liquid slag, so as to avoid contamination,
  keeps the non-immersed portion of the fiber cool, so as to avoid devitrification,
  is a guide that retains straightness of the withdrawing optical fiber, so as to prepare the fiber for the next usage,
  is disposable, such that a new straight piece is used each time to guarantee dimensions;
a gas plug, which
  encloses the tube, so as to allow the creation of a back pressure within the tube,
  is flexible to accommodate non-ideal fiber end.

The device must further immerse the optical fiber in the steel bath over a sufficiently long length using an apparatus that:

Is mounted on the EAF side wall;

Has a preferred 20 sec cycle time;

Monitors the location of the end of the fiber at all times, directly and indirectly using encoders and inductive position devices;

Refurbishes the outer tube and the gas plug and positions the fiber inside and through both;

Ejects used outer tube and gas plug into EAF while recoiling unused fiber;

Is capable of +2000 mm/sec feed with near instant deceleration;

Inserts fiber and outer tube into the EAF at differential velocities;

Has reversible and independent reversible drive capabilities (moving in opposite directions);

Has momentum compensating actuators for de-spooling and recoiling of fiber; and

Has remote instrumentation for temperature and bath level detection.

U.S. Pat. No. 5,585,914 recognizes that intermittent optical fiber feeding provides intermittent temperatures. When the on-demand temperature availability is sufficient to guide the metallurgical process, then the requirement for continuous temperature becomes unsupported by the technical need for such data.

In the above disclosure, a 10 mm/sec feed for 10 sec with a 20 sec off time was described to be adequate for the LD process. During the off time, the fiber must be vibrated in order to prevent the outer jacket from welding to the nozzle. During both the feeding and waiting times gas is purged through the nozzle, whose diameter is fixed by the OD of the outer fiber jacket to be between 1.8 mm and 4.2 mm.

Through this nozzle flows a purged gas contained by a series of rubber plugs contained in a housing supplied with oil.

EP 0 802 401 A also provides for on-demand temperature readings of a 2-3 sec duration, utilizing an optical fiber fed through a gas purged guide tube or an "extension means," for the purpose of protecting the extended (but not immersed) portion of the optical fiber. Both these outer tubes are not consumable. An immersion apparatus is equipped to cut off the devitrified portion of the optical fiber, so a fresh surface is presented every 4-5 immersions.

Japanese Patent JP 3,351,120 B discloses a continuously fed metal-covered optical fiber having an additional consumable outer metal tube, both fed into the metal at the same time. A feeding apparatus is also described. The consumable protective tube of JP 3,351,120 B was continuously present on the outside of the fiber, as if it were an integral part of the fiber. The invention of the present application utilizes a disposable outer tube separate and distinct from the optical fiber. One could not feed the outer metal tube of JP 3,351,120 B without also feeding the fiber. The separation of an additional outer metal tube from the optical fiber is distinct in this invention. It also provides solutions to other problems. While EP 802401 recognizes the need for an extension or guide tube to aid the immersion of the fiber, the guide tube does not extend completely to the metal surface. It is not immersible and not disposable, and because of this, the optical fiber is never completely secure.

In practice, we can treat it the same as a nozzle, and both suffer from problems of blockage. In fact, both the described nozzle and the guide tubes have additional mechanisms to avoid blockage of their apertures from material ingress. The prior art clearly recognizes the importance of a purge gas to prevent slag/steel from entering a nozzle through which the fiber is fed. Since these nozzles are not disposable, the method for sealing the purge gas between the guide tube and the immersion end are typical permanent seals with oil.

In the invention of the present application the disposable outer tube with a disposable gas plug provides a well contained system. This system can use the expansion of the gas instead of the purge gas. In EP 0 802 401 A the guide or extension tube does not contact the metal. Its open end cannot provide for pressurization during heated gas expansion. In the permanent enclosed space of U.S. Pat. No. 5,585,914 once the gas has expanded it can no long provide a displacement for the metal ingress. In JP 3,351,120 B the space between the outer tube and fiber is finitely long, and due to the compressibility of gas cannot be used to provide a heated expansion of gas at the immersion end. The uniqueness of a self-purging outer tube can only be possible with the concept of disposability of the outer tube. This is unique among the entire prior art. It is not obvious because the prior art was solving problems related to maintaining a continuous measurement from a continuously fed optical fiber.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings.

DETAILED DESCRIPTION OF THE INVENTION

Figure 1:
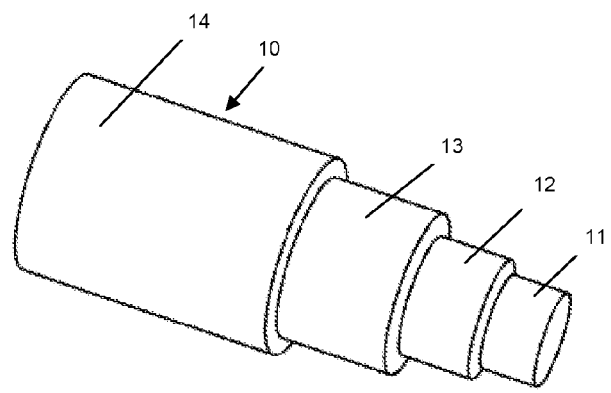
FIG. 1 is a schematic perspective view showing a prior art consumable optical fiber.

The device is described as follows by way of example. FIG. 1. shows prior art consumable optical fiber 10, typically employed in the measurement of liquid metals, comprising an optical fiber, a plastic jacket covering the optical fiber and a protective metal tube covering the surface of the plastic jacket. The optical fiber 10, typically a graded index multimode fiber made of quartz glass having an inner core 11 with a diameter of 62.5 μm and an outer cladding 12 with a diameter of 125 μm covered with a polyimide or similar material 13. The protective metal tube 14 is typically stainless steel having a 1.32 mm outer diameter (OD) and 0.127 mm wall thickness. Although a metal covered optical fiber is preferred, additional embodiments where 14 and/or 13 are replaced by a singular plastic material do not depart from the intended invention.

Figure 2:
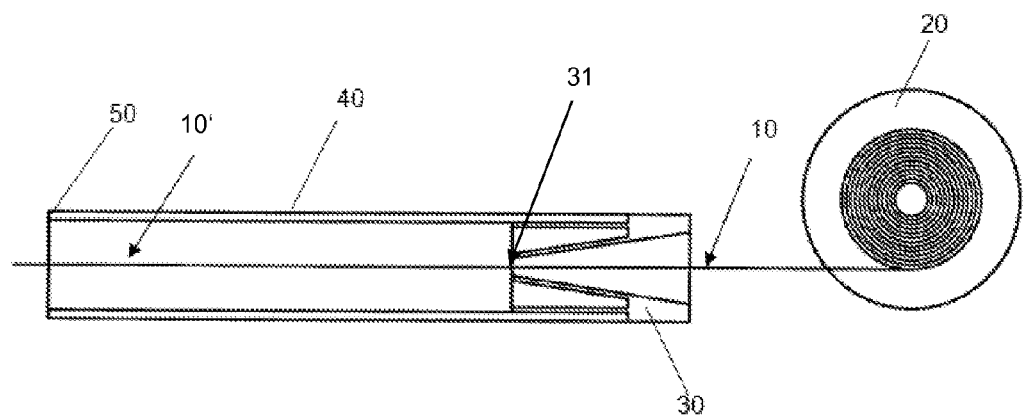
FIG. 2 is a schematic longitudinal sectional view showing the feeding of a leading section of a metal coated optical fiber through a disposable guiding tube according to an embodiment of the invention.

FIG. 2 shows the leading section 10' of a metal coated optical fiber 10, as fed from spool 20 through a gas retaining elastic plug 30, affixed to the opposite end from the immersion end 50 of an outer disposable guiding tube 40. Fiber 10 and outer disposable guiding tube 40 are not in a fixed arrangement and as such can move independent of each other, and thus can be independently inserted through a slag layer 51 and into a molten bath 52 (see FIGS. 3a, 3b and 3c) at different velocities while maintaining a gas seal 31 at opposite end. Disposable guiding tube 40 is preferably low carbon steel having a wall thickness of 0.8 to 1 mm, but may be selected from a variety of metal materials as well as ceramics and glasses, cardboard and plastics or a combination of materials. In the case that disposable guiding tube 40 is selected from a material that reacts with the molten bath, it is advisable that the immersion portion 50 be prepared in a way that it does not splash molten metal on the inside of the disposable guiding tube 40 by the application of coatings or coverings of a materials known in the art for the purpose of splash reduction.

Immersing the open-ended outer disposable guiding tube 40 into the steel through the slag layer 51 without plug 30 would result in ingress of slag and steel into this tube. Molten slag resulting from the refining process is high in oxides, such as iron oxide, which is easily absorbed into the optical fiber structure. The fiber 10 fed through the outer disposable guiding tube 40 containing slag and steel would be damaged before reaching the open end of the outer disposable guiding tube 40. For a preferred outer disposable guiding tube 40, of 2 m length with an immersion depth of 30 cm and open at both ends, the upwelling of molten material inside the outer disposable guiding tube 40 would be 30 cm. In the case of a closed end outer disposable guiding tube 40 the upwelling will be approximately 16 cm. This is calculated ignoring the gas expansion of the enclosed air which will undergo expansion due to an increase in its temperature. Tests show that the steel ingress can be minimized by reducing the air gap between the inner diameter (ID) of the outer disposable guiding tube 40 and the OD of the optical fiber 10 metal covering. It is very preferred to reduce this gap to the minimum, however, practically for tubes having an ID of 10 mm this gap should be less than 2 mm$^2$, preferably less than 1 mm$^2$. Tubes having a smaller ID would allow a larger gap due to the faster heating rate of the enclosed air.

One of the preferred features of the invention is to avoid molten ingress utilizing the expansion of the gas contained in the disposable guiding tube 40. The use of an elastic plug 30 of a certain sealing quality to effectively seal the end opposite to the immersion end will ensure that gas will bubble out the immersed end during immersion, thus keeping the disposable guiding tube 40 clear. Notwithstanding, any means of creating an overpressure in the disposable guiding tube 40 while immersing also avoids steel ingress, such as an internal coating of a material vaporizing at minimal temperatures. A prominent concept towards creating a positive pressure in the outer disposable guiding tube 40 is to avoid the upwelling and intrusion of metal, slag or other contaminants inside the disposable guiding 40 tube that could impede the free feeding of the optical fiber 10.

The plug 30 should be suitably elastic in order to compensate for a non-ideal optical fiber end resulting from the prior immersion. In the preferred embodiment, plug 30 is replaced with each outer disposable guiding tube 40. Each replacement assures a proper seal. However, this plug 30 could be constructed in such a way as to be reused with multiple outer disposable guiding tubes and replaced as a matter of maintenance. The thermoelastic material Santoprene™ (trademark of Exxon Mobil) is one such material that has been found to both remain elastic and surprisingly intact during the duration of the measurement. However, the plug can also be made of a different material, such as wood or another suitable plastic material. The preferred location of the plug 30 at the terminal end of outer disposable guiding tube 40 is selected for ease of application. However, placing the plug 30 closer to the immersion end is equally acceptable and will accomplish a superior overpressure during immersion aiding the error-free immersion of the optical fiber 10. The design of plug 30 facilitates its placement at the extremity of disposable guiding tube 40, showing a lip that rests upon the tube end. Other configurations are possible. The exact embodiment of plug 30 should reflect the ease of positioning and location of its position without departing from the main purpose of the plug to restrict the escape of air in the outer tube, thus ensuring a build-up of inner pressure.

The steel ingress in the steel tube while immersing in the steel bath increases with:
An increase of the immersion depth,
An increase of the tube length,
An increase of the air gap (at the other end),
A lower bath temperature,
A thicker wall thickness, and/or
A higher oxygen content of the steel bath.

Figure 3A:
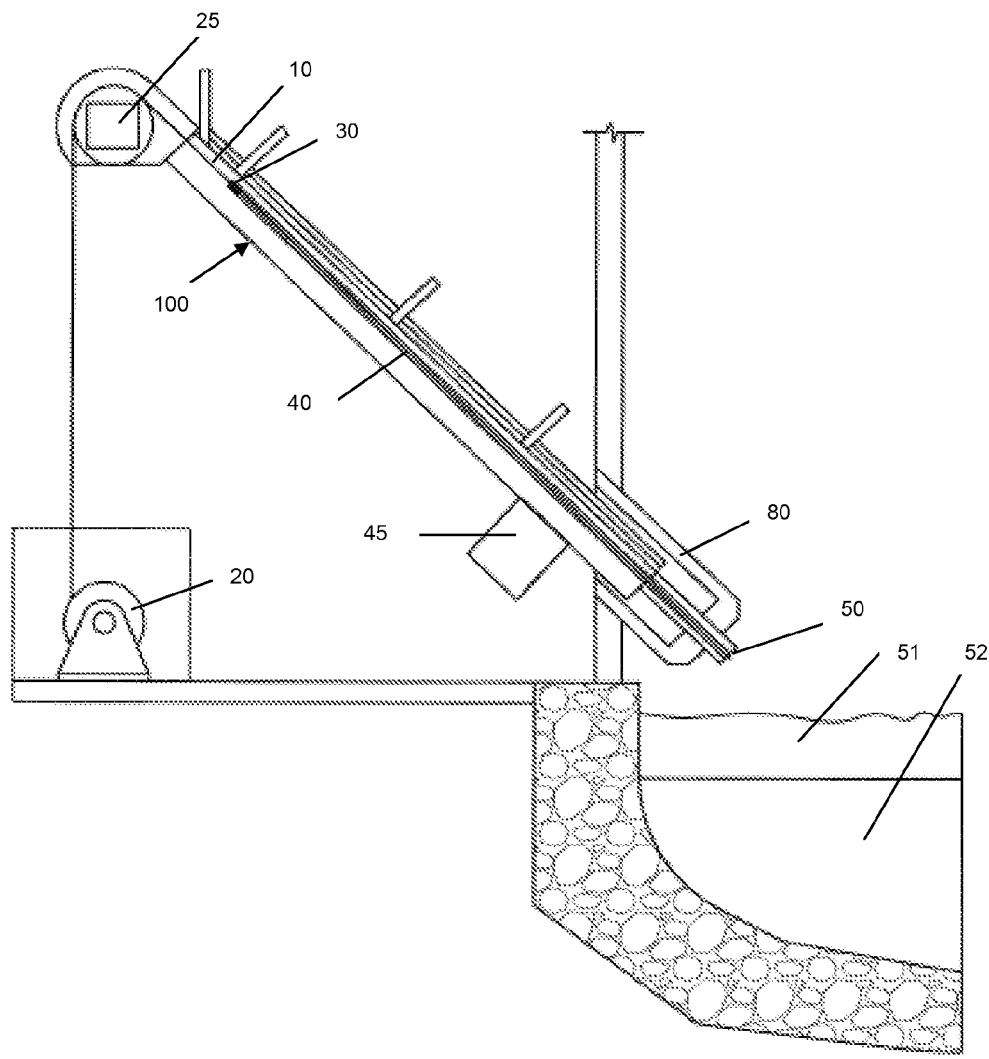
FIG. 3a is a schematic side elevation view showing an immersion device according to an embodiment of the invention before immersing the optical fiber.
Figure 3B:
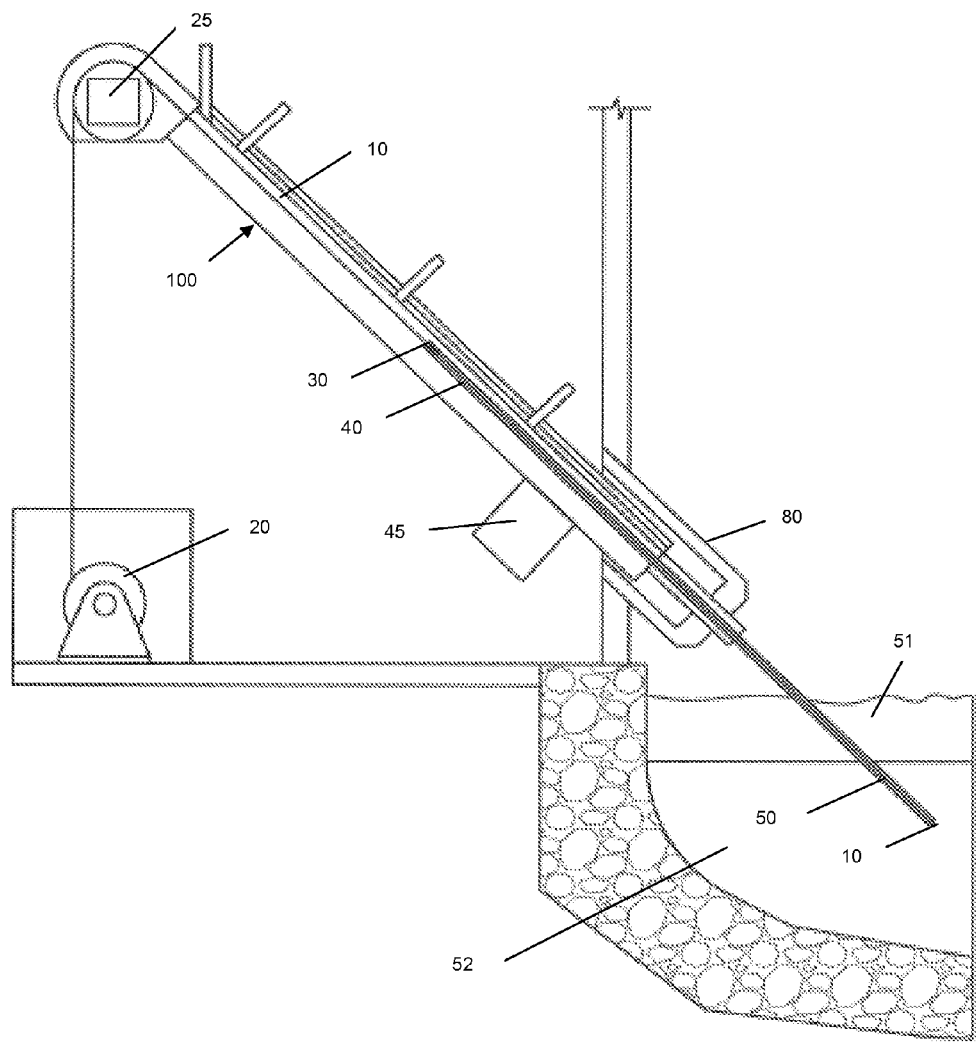
FIG. 3b is a schematic side elevation view similar to FIG. 3a showing the immersion device after immersing the optical fiber.
Figure 3C:
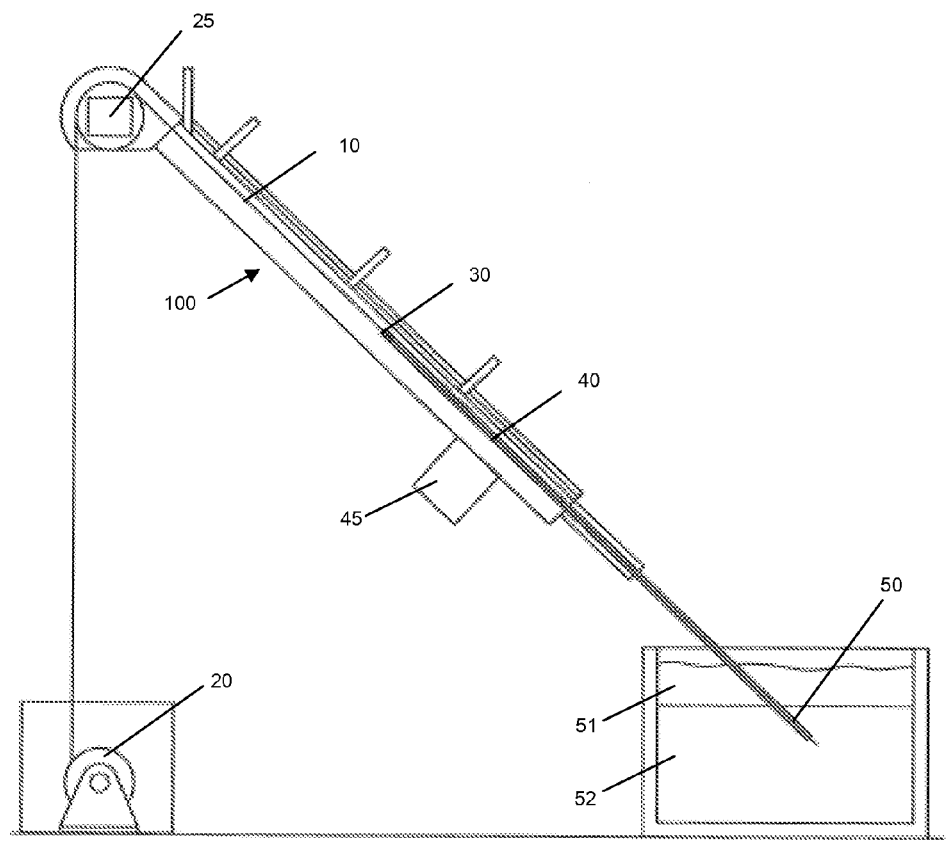
FIG. 3c is a schematic side elevation view showing the immersion device according to FIG. 3b with a different melt container, such as a molten metal ladle or tundish.

The immersion device is described in FIGS. 3a, 3b and 3c. Apparatus 100 is suitably constructed and instrumented in such a manner that assembly of plug 30 to outer disposable guiding tube 40 is aligned so that optical fiber 10 can be inserted through plug 30 into the interior of the outer disposable guiding tube 40. Both the outer disposable guiding tube 40 and optical fiber 10 are fed at approximately 2000 mm/sec through the side wall of an EAF through suitable access panels 80. These panels 80 are not part of the apparatus 100. The apparatus 100 has independent 100% reversible drive or feeding motors 25; 45. Motor 25 drives the optical fiber 10 and motor 45 drives the disposable guiding tube 40, so that the velocity of the outer disposable guiding tube 40 in either direction is independent of the velocity of the optical fiber 10 in either direction.

The apparatus 100 is capable of independent feeding of optical fiber 10 into the bath with a speed less than, equal to, or higher than the speed of the outer disposable guiding tube 40. Preferably, the optical fiber 10 is fed faster, so that both the immersion end 50 of the outer disposable guiding tube 40 and leading section 10' of optical fiber 10 arrive at the predetermined surface of the metal at approximately the same time. Once the bath level position is reached, the outer disposable guiding tube 40 is decelerated to a nearly stationary position in the molten metal 52. The leading section 10' of optical fiber 10 continues to move slowly deeper in the steel at about 200 mm/sec for approximately 0.7 sec. Both the outer disposable guiding tube 40 and the optical fiber 10 are constantly moving at unequal speeds to avoid welding the two metal surfaces together, thus solving a problem stated in the prior art.

The problem of the acceleration and deceleration of the optical fiber 10 is more complicated than moving the outer disposable guiding tube 40. The optical fiber 10 is constantly de-coiled and recoiled from a coil or spool 20 with its coil weight that is constantly changing due to fiber consumption. The feeding apparatus must be adapted with additional mechanics to avoid the elastic spring back effect from the coil or spool 20 itself as well as the weight of the pyrometer connected to the coil. This is solved by using two servo motors or feeding motors 25; 45 to control the fiber movement. One feeding motor 25 takes care of the de-coiling and recoiling of the fiber 10 and pre-feeds fiber 10 in such a way that the feeding motor 25 can accelerate very fast.

The consumable optical fiber 10 receives the radiation light emitted from the molten metal, conveys such to a photo-electric conversion element mounted on the opposite end of the coiled consumable optical fiber, and combined with associated instrumentation measures the intensity of the radiation, using this to determine the temperature of the metal. The optical fiber coil or spool 20 and instrumentation are located at a distance away, and separated from the EAF but are suitably robust to withstand the harsh conditions of the steel-making environment. The location of the immersion end of the optical fiber 10 is constantly known and monitored by apparatus instrumentation throughout the immersion, measuring and removal portions of the immersion cycle. The apparatus is equipped with position encoders that determine the passage of fiber length and inductive switches that register the fiber end.

After the measurement is complete, both the consumable optical fiber 10 and the outer disposable guiding metal tube 40 are withdrawn from the steel with different speeds in such a way that the optical fiber 10 stays relatively deeper in the bath. During this movement, it is capable to determine the bath-level due to a change in the light intensity when correlated with the length of optical fiber 10 extracted between predetermined positions. The post-measurement bath level determination is subsequently used for the next immersion. It is also contemplated that the bath level could be determined during immersion using various techniques well described in the literature without departing from the method of the invention.

Once the optical fiber 10 is clear of the EAF interior, the direction of the outer disposable guiding tube 40 is reversed towards the furnace interior. The outer disposable guiding tube 40 is then ejected, disposed and consumed in the furnace interior. A new outer disposable guiding tube 40 and gas plug 30 are positioned to receive the optical fiber 10 for the next measurement. The remaining optical fiber 10 is recoiled during removal and returned to a starting position.

Key abilities of the invention are:
Accurate payout and recoil of fiber,
Detection of fiber end,
Loading of outer disposable guiding tube,
Load and position of gas plug,
Guide fiber at starting position into gas plug,
Fully reversible drives for both fiber and outer disposable guiding tube,
Independent speed profiles for fiber and outer disposable guiding tube,
Registration of fiber output for level detection, and
Attachable to furnace shell for tilt compensation of bath level.

The method is described by way of example of a total cycle description. This concept should bring us to an operator-free control of EAF's. It is envisioned that the best operation is to take multiple temperature immersions in quick succession (about 5). Each immersion is approximately two sec; the total cycle time should be less than 20 sec during a single heat.

Figure 4:
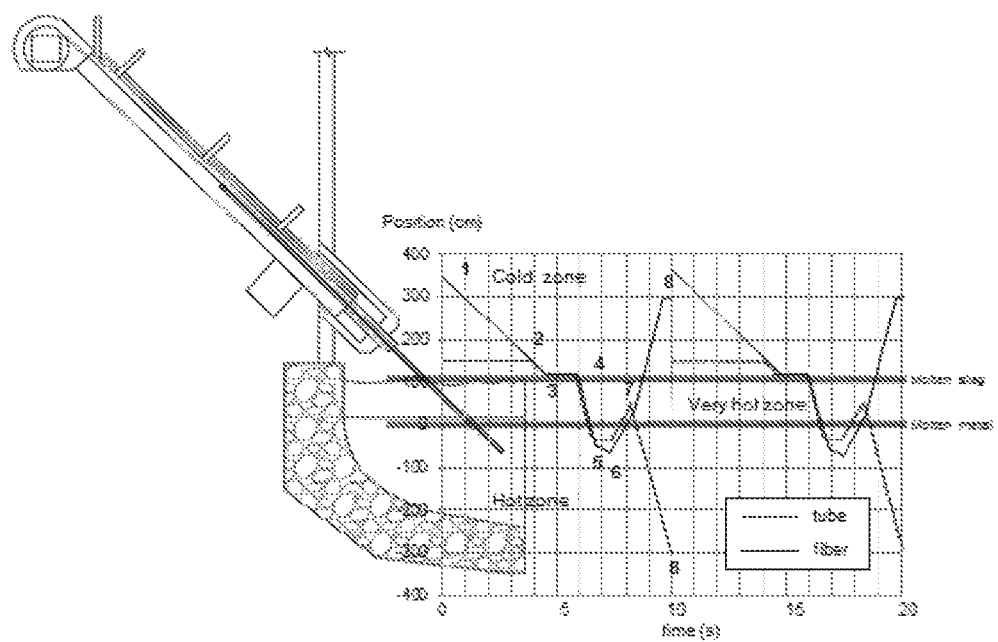
FIG. 4 is a partial side elevation view similar to FIG. 3b superimposed on a graph showing both the positions over time of the immersion end of the outer tube and the immersion end of the optical fiber during immersion.

The schematic of FIG. 4 gives a view of both the position of the immersion end 50 of the outer disposable guiding tube 40 and the immersion end or leading section 10' of the optical fiber 10 during two immersions of a measurement cycle. For fiber movement the end position of the fiber is tracked.

With tube movement the position of the immersed end of the disposable guiding tube 40 is indicated. At the opposite end from the immersion end 50 of the outer disposable guiding tube 40 is the gas plug 30. For the purpose of this schematic, the outer disposable guiding tube 40 is already in the ready-to-immerse position. Gas plug 30 is already attached to the back end, and the optical fiber 10 is just inside the gas plug 30. The relative dimensions shown are for descriptive purposes, understanding that the absolute distances are predicated upon the actual furnace size, which is a variable from steel shop to steel shop.

The starting position 1 at time 0 of the fiber within the outer metal tube is set at 350 cm above the molten metal/bath-level. The starting position 1 at time 0 of the immersion end of the outer metal tube is located at 150 cm above the bath-level. The optical fiber 10 is fed from position 1 to position 2 while the outer disposable guiding tube 40 remains nearly stationary. Between time 0.8 sec and 1.2 sec, covering positions 2 through 4, both optical fiber 10 and outer disposable guiding tube 40 advance to a location just above the molten slag 51. At 1.2 sec and position 4, the fiber is advanced slightly faster than the outer disposable guiding tube 40, passing through the slag 51 and into the molten metal 52. The outer disposable guiding tube 40 slows while the optical fiber 10 advances at approximately 200 mm/sec, reaching the maximum immersion at position 6 and 1.5 sec into the immersion. Both optical fiber 10 and outer disposable guiding tube 40 are extracted within 0.1 sec. The optical fiber 10 continues to be withdrawn and recoiled returning to its load position 8, while the direction of the remains of the outer disposable guiding tube 40 is reversed at position 7 and the remains is discarded. The optical fiber 10 is still protected by the remaining portion of the discarded outer disposable guiding tube 40.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the invention as defined by the appended claims.

We claim:

1. A method for measuring temperature of a melt with an optical fiber, the method comprising feeding the optical fiber into the melt through a disposable guiding tube and immersing the optical fiber and an immersion end of the disposable guiding tube into the melt, wherein a feeding speed of the optical fiber relative to the melt and a feeding speed of the disposable guiding tube relative to the melt are independent from each other.

2. The method according to claim 1, wherein the melt is a molten metal.

3. The method according to claim 1, wherein in a first phase of immersion the disposable guiding tube and the optical fiber are immersed into the melt, and in a second phase of immersion the optical fiber is immersed with higher speed and deeper into the melt than the disposable guiding tube.

4. The method according to claim 3, wherein the second phase starts after the immersion end of the disposable guiding tube is immersed into the melt.

5. The method according to claim 4, wherein in a third phase of immersion the optical fiber is stopped or is withdrawn from the melt.

6. The method according to claim 1, wherein the feeding speed of the disposable guiding tube and/or of the optical fiber is varied during immersion.

7. The method according to claim 1, wherein the optical fiber and the disposable guiding tube are moved with unequal speed.

8. The method according to claim 1, further comprising determining an upper surface of the melt in addition to measuring the temperature.

9. The method according to claim 1, wherein once immersed, the optical fiber and the disposable guiding tube are constantly moving at unequal speeds relative to each other.

10. A method for measuring temperature of a melt with an optical fiber, the method comprising:
feeding the optical fiber into the melt through a disposable guiding tube;
immersing the optical fiber and an immersion end of the disposable guiding tube into the melt, a feeding speed of the optical fiber and a feeding speed of the disposable guiding tube being independent from each other; and
after measurement is complete, stopping or withdrawing the optical fiber from the melt and subsequently ejecting the disposable guiding tube into the melt.

11. A device for measuring temperature of a melt, particularly of a molten metal, the device comprising an optical fiber and a disposable guiding tube, the disposable guiding tube having an immersion end and a second end opposite to the immersion end, wherein the optical fiber is partially arranged in the disposable guiding tube, wherein an inner diameter of the disposable guiding tube is larger than an outer diameter of the optical fiber, wherein an elastic plug is arranged at the second end of or within the disposable guiding tube, wherein the optical fiber is fed through the elastic plug, and wherein the elastic plug reduces a gap between the optical fiber and the disposable guiding tube.

12. The device according to claim 11, wherein an area of the gap is reduced by the elastic plug to less than 2 mm$^2$.

13. The device according to claim 12, wherein the area of the gap is reduced by the elastic plug to less than 1 mm$^2$.

14. The apparatus according to claim 11, wherein the disposable guiding tube is a metal tube.

15. The apparatus according to claim 11, wherein the disposable guiding tube and the elastic plug are configured to be ejected into the melt after measurement of the temperature of the melt.

16. An apparatus for measuring temperature of a melt with an optical fiber, particularly of a molten metal, the apparatus comprising a device according to claim 11, and further comprising a fiber coil and a feeding mechanism for feeding the optical fiber and the disposable guiding tube, wherein the feeding mechanism comprises at least two independent feeding motors, one for feeding the optical fiber and one for feeding the disposable guiding tube.

17. The apparatus according to claim 16, wherein the feeding motors are each combined with a separate speed control.

* * * * *